UNITED STATES PATENT OFFICE.

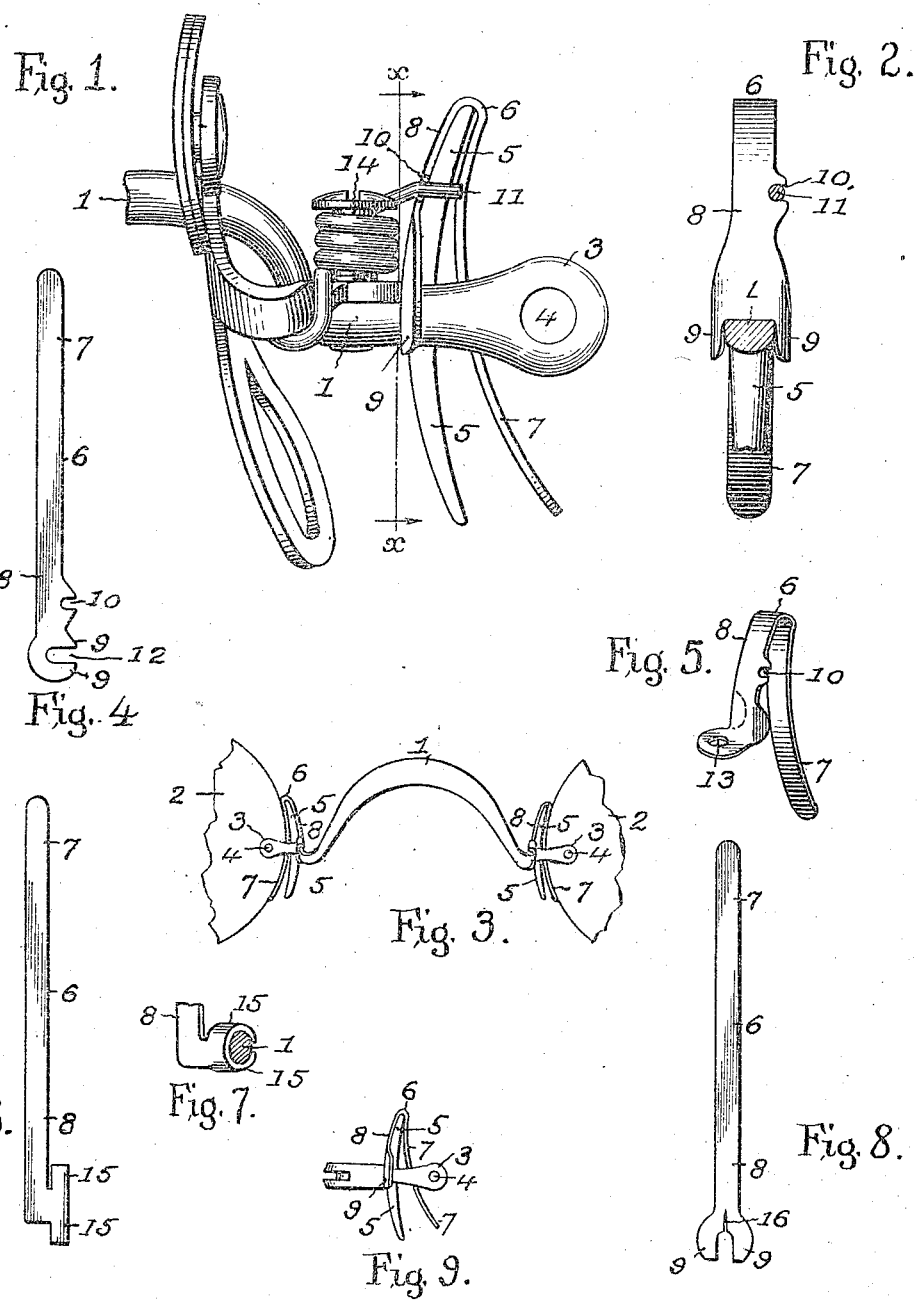
W. R. UHLEMANN.
LENS MOUNTING.
APPLICATION FILED FEB. 5, 1917.
1,250,248. Patented Dec. 18, 1917.
Inventor,
William R. Uhlemann.

WILLIAM R. UHLEMANN, OF CHICAGO, ILLINOIS.

LENS-MOUNTING.

1,250,248.   Specification of Letters Patent.   Patented Dec. 18, 1917.

Application filed February 5, 1917. Serial No. 146,666.

*To all whom it may concern:*

Be it known that I, WILLIAM R. UHLEMANN, a citizen of the United States of America, and a resident of Chicago, in the county of Cook, State of Illinois, have invented certain new and useful Improvements in Lens-Mountings, of which the following is a specification.

This invention relates to mountings for eyeglasses and spectacles of the frameless or rimless order, and more especially to the type of such mountings which constitutes the subject matter of my prior Letters Patent No. 933,502, dated September 7, 1909.

And the present improvement has for its object to provide a simple and efficient structural formation and association of the mounting parts whereby the lenses are pivotally attached to a fixed part of the mounting and resiliently held to their proper visual positions, and in which the degree of movement of a lens against the resilient holding stress is limited in a very effective manner. The purpose is to prevent breakage of the lenses due to sudden jars and the like. Another object is to provide a simple and economical means for detachably securing the resilient member or element in place on the mounting, all as will hereinafter more fully appear.

In the accompanying drawings:—

Figure 1, is an enlarged elevation of one side of a finger piece eyeglass mounting embodying the present invention.

Fig. 2, is a transverse sectional elevation on line *x—x*, Fig. 1.

Fig. 3, is an elevation of a spectacle mounting having the present improvement applied.

Fig. 4, is an elevation of a modified form of the blank for forming the resilient member of the structure.

Fig. 5, is a perspective view of a modified form of the resilient member aforesaid.

Fig. 6, is an elevation of the blank of another modified form of the aforesaid resilient member.

Fig. 7, is a detail perspective view showing the application of the last mentioned resilient member to the bridge of an eyeglass.

Fig. 8, is an elevation of the blank of another modified form of the resilient member aforesaid.

Fig. 9, is a detail elevation illustrating the invention to the temple mounting of a pair of spectacles.

Similar reference numerals indicate like parts in the several views.

In the drawings, 1 designates the usual rigid connecting bridge or arch by which the pair of frameless lenses 2 of an eyeglass or spectacles are positively connected together in proper spaced relation by means of the usual attaching clips or straps 3, and transverse screws or rivets 4 passing through transverse orifices in said straps and in the marginal portion of the lenses.

5 designates the usual upper and lower braces, associated with the straps 3 aforesaid, and disposed in associated relation to the edge of an individual lens 2.

The material part of the present invention comprises a resilient bearing or abutment element for the edge of a lens adjacent to the pivotal connection of said lens to the straps 3 and involves a structural formation as follows:

6 designates a resilient element or member formed of a strip of metal bent to a saddle shape, as shown, with its bend or crown adapted to straddle and rest upon the top of the upper brace 5 as shown in Figs. 1, 2 and 9. The inner depending portion 7 of the resilient member 6 is of a curved form and is disposed between the braces 5 and the adjacent edge of a lens 2, as illustrated more particularly in Fig. 3. The upper depending portion 8 of the resilient member 6 is of a curved form adapted to fit against the outer side surface of the upper brace 5 aforesaid, and its lower end is formed for attachment to the bridge 1 or other fixed part of the mounting preferably by means as follows:—

9 designates a pair of spaced prongs at the lower end of the outer depending portion 8 of the resilient member 6, and providing an open bottom recess adapted to engage the bridge 1, while the prongs 9 have frictional engagement with the sides of said bridge 1, as illustrated more particularly in Fig. 1.

10 designates a side recess in the outer depending portion 8 of the resilient member 6, adapted to receive an end of a spring 11 of the finger piece mechanism of an eyeglass mounting and so that the parts may coöperate in maintaining each other in their proper position in actual use.

In the modification illustrated in Fig. 4, the same structural formation as above described is used, with the exception that the bridge engaging recess 12 opens at one side of the resilient member 6.

In the modified attaching means illustrated in Fig. 5, the lower end of the depending outer portion 8 of the resilient member 6, is formed with a laterally extending orificed flange or extension 13, adapted to fit the pivot post 14 of the finger piece mechanism aforesaid, and be confined in place by the usual attaching means of said mechanism.

In the modified attaching means illustrated in Figs. 6 and 7, the lower end of the outer depending portion of the resilient member 6, is formed with a pair of side flanges or ears 15 adapted to be bent around the bridge 1, as shown.

In the modification shown in Fig. 8, the same structural formation as that described in connection with Figs. 1 and 2, will prevail, with the exception that the bridge engaging recess will connect with a central slit 16, with a view to impart greater resilient or holding action to the prongs 9 forming the sides of said recess.

In Fig. 9, the invention is shown applied to the temple mounting of a frameless pair of spectacles, and is intended to illustrate the preferred structural formation of the present invention, applied thereto, and involving the construction described in connection with Figs. 1 and 2.

Having thus fully described my said invention, what I claim as new and desire to secure by Letters Patent, is:—

1. A lens mounting, comprising a pair of attaching straps upper and lower braces fixedly associated with said straps, and a resilient abutment member comprising a strip of resilient material having a saddle shape and arranged to straddle the upper brace aforesaid, the inner depending portion of said resilient member being adapted to bear against the edge of the lens while the outer depending portion of said member is detachably secured adjacent to the base of the upper brace aforesaid, substantially as set forth.

2. A lens mounting, comprising a pair of attaching straps upper and lower braces fixedly associated with said straps, and a resilient abutment member comprising a strip of resilient material having a saddle shape and arranged to straddle the upper brace aforesaid, the inner depending portion of said resilient member being adapted to bear against the edge of the lens while the outer depending portion of said member is provided with a recess and marginal prongs at its lower end for engagement with a part fixedly associated with the base of the upper brace aforesaid, substantially as set forth.

3. A lens mounting comprising a bridge, a pair of attaching straps and a pair of braces fixedly associated with said bridge, and a resilient abutment member comprising a strip of resilient material having a saddle shape and arranged to straddle the uppermost brace, the inner depending portion of said resilient member being adapted to bear against the edge of the lens while the outer depending portion of said member is detachably secured to the bridge aforesaid, substantially as set forth.

4. A lens mounting, comprising a bridge, a pair of attaching straps and a pair of braces fixedly associated with said bridge, and a resilient abutment member comprising a strip of resilient material having a saddle shape and arranged to straddle the uppermost brace, the inner depending portion of said resilient member being adapted to bear against the edge of the lens while the outer depending portion of said member is provided with a recess and marginal prongs at its lower end for engagement with the bridge aforesaid, substantially as set forth.

5. A lens mounting, comprising a bridge, a pair of attaching straps and a pair of braces fixedly associated with said bridge, and a resilient abutment member comprising a strip of resilient material having a saddle shape and arranged to straddle the uppermost brace, the inner depending portion of said resilient member being adapted to bear against the edge of the lens while the outer depending portion of said member is detachably secured to the bridge aforesaid, and is provided with a lateral recess intermediate its height for the reception of an end of an operating spring of the finger piece mechanism of the mounting, substantially as set forth.

Signed at Chicago, Illinois, this 31st day of January, 1917.

WILLIAM R. UHLEMANN.

Copies of this patent may be obtained for five cents each, by addressing the "Commissioner of Patents, Washington, D. C."